(12) United States Patent
Watanabe et al.

(10) Patent No.: US 8,159,540 B2
(45) Date of Patent: Apr. 17, 2012

(54) SEMICONDUCTOR DEVICE AND IMAGING CAPTURING APPARATUS

(75) Inventors: Tomofumi Watanabe, Gifu (JP);
Tomonori Kamiya, Ichinomiya (JP);
Yoshihisa Yamada, Inazawa (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 725 days.

(21) Appl. No.: 12/323,931

(22) Filed: Nov. 26, 2008

(65) Prior Publication Data
US 2009/0141137 A1    Jun. 4, 2009

(30) Foreign Application Priority Data

Nov. 28, 2007 (JP) ................................. 2007-307698
Nov. 28, 2007 (JP) ................................. 2007-307699
Sep. 24, 2008 (JP) ................................. 2008-244571
Sep. 24, 2008 (JP) ................................. 2008-244572

(51) Int. Cl.
*H04N 5/228* (2006.01)
*G03B 17/00* (2006.01)
*G11B 7/00* (2006.01)

(52) U.S. Cl. ............. 348/208.1; 348/208.2; 348/208.3; 348/208.4; 348/208.5; 348/208.6; 348/208.7; 348/208.8; 348/208.16; 396/53; 396/54; 396/55; 720/692

(58) Field of Classification Search .. 348/208.1–208.16; 396/53–55; 720/692
See application file for complete search history.

(56) References Cited

U.S. PATENT DOCUMENTS

| 6,734,901 B1 | 5/2004 | Kudo et al. |
| 8,022,999 B2* | 9/2011 | Okada ....................... 348/208.7 |
| 2007/0212046 A1* | 9/2007 | Sogoh et al. ................... 396/55 |

FOREIGN PATENT DOCUMENTS

| JP | 7-23277 A | 1/1995 |
| JP | 10-213832 A | 8/1998 |
| JP | 11-187308 A | 7/1999 |
| JP | 2002-57270 A | 2/2002 |

* cited by examiner

*Primary Examiner* — Jason Chan
*Assistant Examiner* — Joel Fosselman
(74) *Attorney, Agent, or Firm* — Cantor Colburn LLP

(57) ABSTRACT

A MCP semiconductor device with an "anti-shake" function includes a driver chip and a logic chip. The logic chip includes a correction signal processing unit which obtains a value for vibration of apparatus based on a vibration detection signal to generate a correction signal and a control signal output unit having a plurality of types of signal output sections which output a vibration control signal in accordance with the correction signal to a vibration correction control unit which executes vibration correction control for an optical component. The logic chip further includes a driver output terminal which outputs the vibration control signal to the driver chip, an external output terminal which outputs the control signal to an external circuit other than the driver chip, and also an output switch unit which connects one of the plurality of signal output sections with the driver output terminal or the external output terminal.

15 Claims, 6 Drawing Sheets

SEMICONDUCTOR DEVICE AND IMAGING CAPTURING APPARATUS

PRIORITY INFORMATION

This application claims priority to Japanese Patent Applications No. 2007-307698, filed on Nov. 28, 2007, No. 2007-307699, filed on Nov. 28, 2007, No. 2008-244571, filed on Sep. 24, 2008, No. 2008-244572, filed on Sep. 24, 2008 which are incorporated herein by reference in their entirety.

BACKGROUND

1. Technical Field

The present invention relates to a semiconductor device which controls vibration, such as vibration caused by hand vibration or the like, and more particularly to a logic chip which processes a signal for anti-shake control.

2. Related Art

In image capturing apparatuses such as video cameras and digital still cameras, there has been a demand to prevent poor images caused by blurring of a subject image resulting from vibration, typically due to hand movement. In response to this demand, such apparatuses have come to be commonly provided with an "anti-shake" function. One known method for implementing an anti-shake function is by detecting vibration of the image capturing apparatus with respect to a subject, and, in response to the detected vibration, shifting and correcting an optical system (lens) or the like using a motor. See, for example, JP 7-23277 A, JP 10-213832 A, and JP 11-187308 A.

The above-listed references disclose the use of a microcomputer for signal processing performed for computing a correction amount in accordance with the vibration. The use of a microcomputer for signal processing is advantageous in that various types of processing operations can be achieved by a single microcomputer. On the other hand, there are problems that, because the processing rate of a microcomputer decreases as the volume of signal processing increases, performing the processing required by the microcomputer in order to achieve higher functionality is more difficult in apparatuses provided with an anti-shake function.

While integrating dedicated signal processing circuits (dedicated circuits) can effectively increase the processing rate, such integration of dedicated circuits requires redesign of the dedicated circuits each and every time the apparatus design is changed, and therefore significantly and undesirably increases manufacturing costs.

SUMMARY

There is therefore today a demand for a semiconductor device provided with an anti-shake function, which may be employed in a wide range of applications and which can achieve high-speed processing.

In accordance with an aspect of the present invention, there is provided a semiconductor device in which a driver chip having an analog circuit and a logic chip having a digital circuit are sealed in a single package, the driver chip including a vibration correction control unit for achieving an anti-shake function in an apparatus in which the semiconductor device is provided, and the logic chip including a correction signal processing unit which obtains a value for vibration of the apparatus based on a vibration detection signal supplied from a vibration detection element to generate a correction signal, a control signal output unit which includes a plurality of types of signal output sections and outputs a vibration control signal in accordance with the correction signal to the vibration correction control unit which executes vibration correction control for an optical component in accordance with vibration, a driver output terminal which outputs the vibration control signal to the driver chip, an external output terminal which outputs a control signal to an external circuit other than the driver chip, and an output switch unit which connects one signal output section among the plurality of types of signal output sections with the driver output terminal for outputting the vibration control signal corresponding to a driving unit which drives the optical component and connects another signal output section of the plurality of types of signal output sections with the external output terminal for outputting the control signal corresponding to the external circuit.

In accordance with another aspect of the invention, in the above semiconductor device, the plurality of types of signal output sections include at least two types of signal output sections among a voice coil motor control signal output section, a stepping motor control signal output section, and a piezo element control signal output section.

In accordance with another aspect of the invention, in the above semiconductor device, the plurality of types of signal output sections include a voice coil motor control signal output section having a digital to analog conversion circuit which converts a digital signal supplied from the correction signal processing unit to an analog signal and a pulse width modulation unit which generates a pulse width modulation signal from a digital signal supplied from the correction signal processing unit, and the output switch unit connects one of the digital to analog conversion circuit and the pulse width modulation unit with the driver output terminal and connects either one of the other one of the digital to analog conversion circuit and the pulse width modulation unit or another signal output section among the plurality of types of signal output sections other than the voice coil motor control signal output section with the external output terminal.

In accordance with another aspect of the invention, in the above semiconductor device, the control signal output unit includes a plurality of types of signal output sections capable of respectively outputting the vibration control signal corresponding to a plurality of types of vibration correction control sections which can be adopted as the vibration correction control unit which executes vibration correction control for the optical component.

In accordance with another aspect of the invention, there is provided an image capturing apparatus including a lens, an image sensor, a driving unit which drives the lens or the image sensor, a vibration detection element which detects vibration of the image capturing apparatus, and a semiconductor device in which a driver chip having an analog circuit and a logic chip having a digital circuit are sealed in a single package, wherein the driver chip of the semiconductor device includes a vibration correction control unit for achieving an anti-shake function in the image capturing apparatus, and the logic chip of the semiconductor device includes a correction signal processing unit which obtains a value for vibration of the image capturing apparatus based on a vibration detection signal supplied from the vibration detection element to generate a correction signal, a control signal output unit which includes a plurality of types of signal output sections and outputs a vibration control signal in accordance with the correction signal to the vibration correction control unit which executes vibration correction control for the lens or the image sensor in accordance with vibration, a driver output terminal which outputs the vibration control signal to the driver chip, an external output terminal which outputs a control signal to an external circuit other than the driver chip, and an output switch unit which connects one signal output section among the plurality of types of signal output sections with the driver output terminal for outputting the vibration control signal corresponding to the driving unit and connects another signal output section of the plurality of types of signal output sections with the external output terminal for outputting the control signal corresponding to the external circuit.

In accordance with a further aspect, there is provided a semiconductor device in which a driver chip having an analog circuit and a logic chip having a digital circuit are fabricated on a common substrate and sealed in a single package, the driver chip including a vibration correction control unit for achieving an anti-shake function in an apparatus in which the semiconductor device is provided, the logic chip including a correction signal processing unit which obtains a value for vibration of the apparatus based on a vibration detection signal supplied from a vibration detection element to generate a correction signal, a control signal output unit which includes a plurality of types of signal output sections and outputs a vibration control signal in accordance with the correction signal to the vibration correction control unit, a driver output terminal which outputs the vibration control signal to the driver chip, an external output terminal which outputs a control signal to an external circuit other than the driver chip, an output switch unit which connects one signal output section among the plurality of types of signal output sections with the driver output terminal for outputting the vibration control signal corresponding to a driving unit which drives the optical component and connects another signal output section of the plurality of types of signal output sections with the external output terminal for outputting the control signal corresponding to the external circuit, and a central processing unit which performs processing of a signal to be used in the apparatus, wherein the correction signal processing unit is formed of either one or both of the central processing unit and a dedicated circuit which executes signal processing for generating the correction signal from the vibration detection signal, and a signal from the central processing unit is supplied to a signal output section connected with the external output terminal among the plurality of signal output sections, and the control signal which is generated based on the signal which is supplied is output through the external output terminal.

In accordance with a further aspect, in the above semiconductor device, the plurality of types of signal output sections include at least two types of signal output sections among a voice coil motor control signal output section, a stepping motor control signal output section, and a piezo element control signal output section.

In accordance with a further aspect, in the above semiconductor device, the central processing unit is capable of executing at least a part of the signal processing to be performed by the dedicated circuit of the correction signal processing unit.

In accordance with a further aspect, in the above semiconductor device, the plurality of types of signal output sections are provided corresponding to a plurality of types of vibration correction control sections which can be adopted as the vibration correction control unit which executes vibration correction control for the optical component.

In accordance with a still further aspect of the invention, there is provided an image capturing apparatus comprising a lens, an image sensor, a driving unit which drives the lens or the image sensor, a vibration detection element which detects vibration of the image capturing apparatus, and a semiconductor device in which a driver chip having an analog circuit and a logic chip having a digital circuit are fabricated on a common substrate and sealed in a single package, wherein the driver chip of the semiconductor device includes a vibration correction control unit for achieving an anti-shake function in the image capturing apparatus, and the logic chip of the semiconductor device includes a correction signal processing unit which obtains a value for vibration of the apparatus based on a vibration detection signal supplied from the vibration detection element to generate a correction signal, a control signal output unit which includes a plurality of types of signal output sections and outputs a vibration control signal in accordance with the correction signal to the vibration correction control unit, a driver output terminal which outputs the vibration control signal to the driver chip, an external output terminal which outputs a control signal to an external circuit other than the driver chip, an output switch unit which connects one signal output section among the plurality of types of signal output sections with the driver output terminal for outputting the vibration control signal corresponding to the driving unit and connects another signal output section of the plurality of types of signal output sections with the external output terminal for outputting the control signal corresponding to the external circuit, and a central processing unit which performs processing of a signal to be used in the image capturing apparatus, and wherein the correction signal processing unit is formed of either one or both of the central processing unit and a dedicated circuit which executes signal processing for generating the correction signal from the vibration detection signal, and a signal from the central processing unit is supplied to a signal output section connected with the external output terminal among the plurality of signal output sections, and the control signal which is generated based on the signal which is supplied is output through the external output terminal.

According to the present invention, the central processing unit and the signal processing circuit unit are provided as units for processing the correction signal within the logic chip and these units can be selectively used in a switchable manner. With this configuration, a single logic chip can be used to accomplish both high-speed processing by dedicated circuits and highly-versatile processing by the central processing unit.

Further, because the external output terminal is provided in addition to the output terminal to the driver chip which is fabricated with the logic chip in a multichip package, both the output terminal to the driver chip and the external output terminal can output the corresponding control signals. It is therefore even possible to supply a vibration control signal to a vibration correction control unit which is not packaged, so that the range of potential applications of the chip can be increased.

BRIEF DESCRIPTION OF THE DRAWINGS

A preferred embodiment of the present invention will be described in detail based on the following figures, wherein.

DETAILED DESCRIPTION

A preferred embodiment of the present invention will be described in detail with reference to the accompanying drawings.

Figure 1:
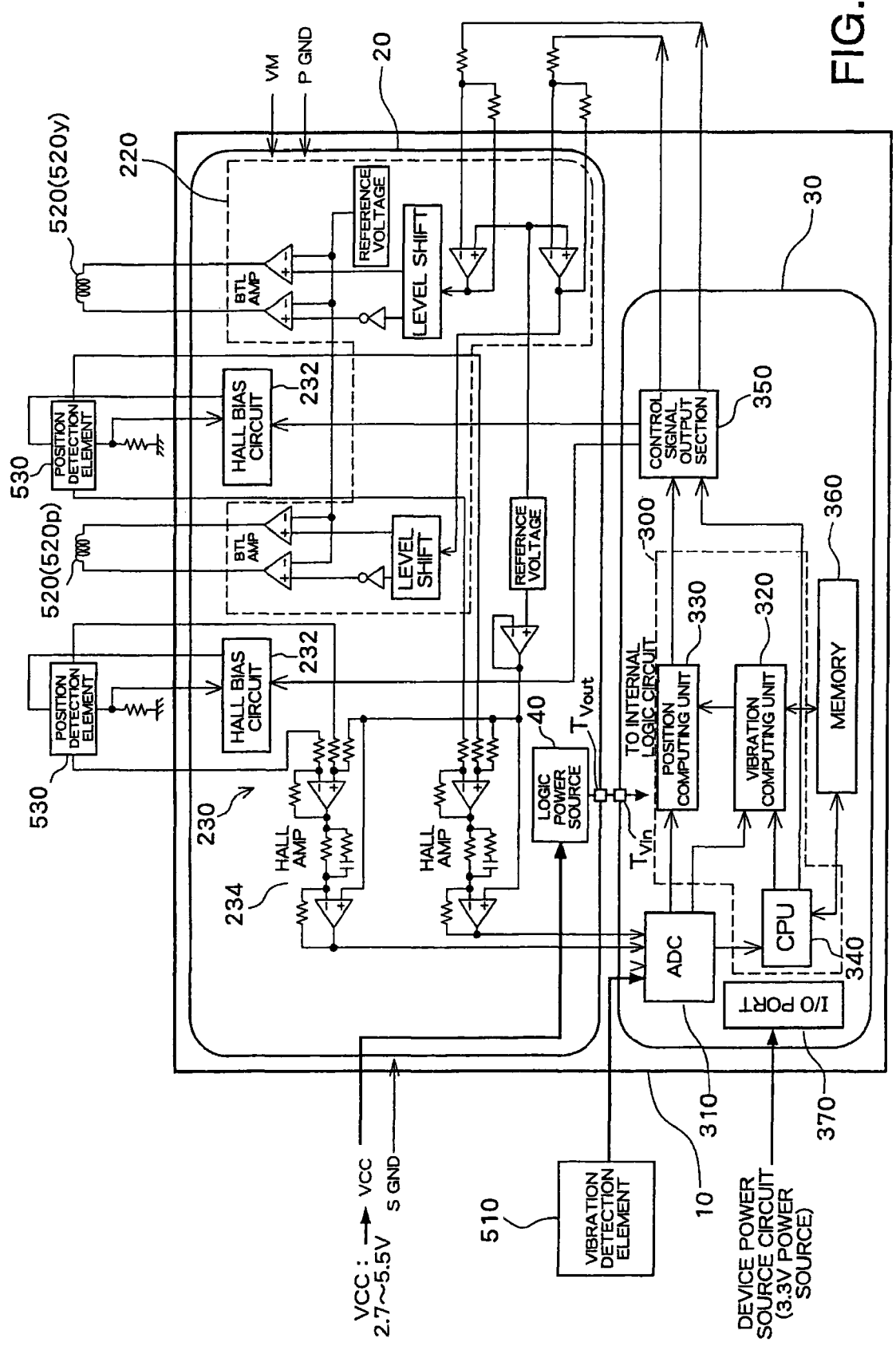
FIG. 1 is a schematic diagram showing an example circuit structure of a multi-chip package according to an embodiment of the present invention.

FIG. 1 schematically shows a structure of a semiconductor device 10 having an anti-shake function according to an embodiment of the present invention. The semiconductor device 10 is a semiconductor device having a multi-chip package (MCP) structure. More specifically, a driver chip 20 having analog circuits and a logic chip 30 having digital circuits are contained on a common substrate and sealed in a single package.

The semiconductor device 10 is used for executing processing for implementing an anti-shake function, such as for use in image capturing apparatuses including video cameras, digital still cameras, and so on, for example, namely, for image stabilization. Although applications of the anti-shake function of the present embodiment are not exclusive to image capturing apparatuses, the description of this embodiment will be based on an example semiconductor device for implementing the anti-shake function of an image capturing apparatus.

Image capturing apparatuses often adopt an anti-shake function in order to prevent the capturing of poor images caused by blurring of a subject image resulting from vibration, typically due to hand vibration. The anti-shake function can be implemented by a method for detecting vibration of the image capturing apparatus with respect to the subject, and in accordance with the vibration, shifting and correcting an optical component using a motor, or by a method for correcting captured image data. In this embodiment, a semiconductor device which implements the anti-shake function based on the shift correction method will be described. Here, the optical component includes an optical system such as a lens, an image sensor such as a CCD, or the like.

Here, when performing detection of vibration by utilizing a vibration detection element and performing mechanical correction based on a vibration correction signal determined from the detected vibration, processing of analog signals is required. It is therefore preferable to process the analog signals by the driver chip 20 having analog circuits.

On the other hand, to obtain the vibration correction signal for correcting the vibration on the basis of the detected vibration, it is preferable to perform logic operations on the vibration detection signal as a digital signal, and generation of such a vibration control signal is preferably executed by the logic chip 30 having digital circuits.

In the example shown in FIG. 1, a vibration detection element 510 attached externally to the semiconductor device 10 detects the vibration. The vibration which is detected is amplified by an analog-to-digital converter (ADC) 310, and the signal thus amplified is used, as a vibration detection signal, for computing a correction amount. Here, an angular velocity sensor such as a gyroscopic sensor, for example, is used for the vibration detection element 510.

A vibration control signal generated by the logic chip 30 is supplied to a vibration correction control unit 220 for vibration correction of the driver chip 20. Here, the vibration correction control unit 220 has a function corresponding to a driving unit (vibration correction element) 520 which is adopted.

In the example shown in FIG. 1, the driving unit 520 or the like attached externally to the semiconductor device 10 is used for adjusting the position of the optical component so as to cancel any shift of the image capturing apparatus with respect to the subject due to vibration. Here, voice coil motors (VCM), for example, may be used as the driving unit 520. When VCMs are used as the driving units 520, VCMs 520$p$ and 520$y$ are provided in the pitch and yaw directions, respectively, and are capable of vibration correction by respectively shifting the lens position in the pitch and yaw directions. The vibration correction control unit 220 is used for driving the driving units 520 and also has a circuit for performing BTL (Bridged Transless) drive of the coils of the VCMs 520. Specifically, the vibration control signals are shifted to desired levels by level shifters provided in the vibration correction control unit 220, then amplified by BTL amplifiers, and supplied to the VCM coils to drive the VCMs 520.

The lens position is detected by driving a position detection element 530 attached externally to the semiconductor device 10. Here, a Hall device, for example, may be used as the position detection element 530. In this example, two Hall devices 530, an x-axis Hall device and a y-axis Hall device, are provided. Position detection signals detected by the position detection elements 530 are supplied to the logic chip 30 and used for lens drive feedback by the driving unit 520.

A position detection element circuit 230 is provided within the driver chip 20 and includes Hall bias circuits 232 for applying a bias voltage to the position detection elements 530 and Hall amplifiers 234 for creating the position detection signals obtained by amplifying signals obtained from the position detection elements 530.

The logic chip 30 includes an analog-to-digital conversion circuit (ADC) 310, a correction signal processing unit 300 for creating a correction signal from the position detection signal, and a control signal output unit 350 for outputting a vibration control signal in accordance with the correction signal.

The ADC 310 converts analog signals, such as the vibration detection signals obtained from the vibration detection element 510 and the position detection signals obtained from the Hall amplifiers 234, to digital signals.

The correction signal processing unit 300 includes a vibration computing unit 320 and a position computing unit 330. The vibration computing unit 320 obtains a movement amount signal (a vibration amount) from the vibration detection signal output from the ADC 310. The position computing unit 330 obtains a correction signal for position correction of the optical component from the position detection signal and the movement amount signal. The correction signal processing unit 300 further includes a central processing unit (CPU) 340 which controls operations of the vibration computing unit 320 and the position computing unit 330 or which is capable of executing a part or all of the vibration computation and the position computation performed by the vibration computing unit 320 and the position computing unit 330, as will be described below.

The control signal output unit 350 includes a plurality of types of signal output sections, as will also be described below. These signal output sections receive and output the correction signals obtained in the correction signal processing unit 300 to corresponding vibration correction control units, respectively. Here, a plurality of types of vibration correction control units are provided corresponding to the signal output sections 350, respectively, and execute vibration correction control for the optical component.

Here, a memory unit 360, such as ROM or SRAM, for storing data necessary for computation, an external input/ output terminal circuit (I/O port) 370, and so on are also integrated in the logic chip 30.

In the logic chip 30, the I/O port 370 operates by receiving a 3.3 V power supply from an external device power supply circuit. On the other hand, the correction signal processing unit 300 in this embodiment employs a low voltage circuit which operates by receiving a 1.2 V power supply. In the present embodiment, the power supply (1.2 V power supply) supplied to the correction signal processing unit 300 is generated in a logic chip power supply circuit 40 which is fabricated within the above-mentioned driver chip 20 which is packaged together with the logic chip 30. The driver chip 20 includes, in addition to the logic chip power supply circuit 40, the analog circuits such as the vibration correction control unit 220 and the position detection element circuit 230. These circuits included within the driver chip 20 can be fabricated including bipolar transistors or the like on the same semiconductor substrate. The logic chip power supply circuit 40 can also be fabricated by utilizing a band gap constant voltage circuit including bipolar transistors and so on.

Figure 2:
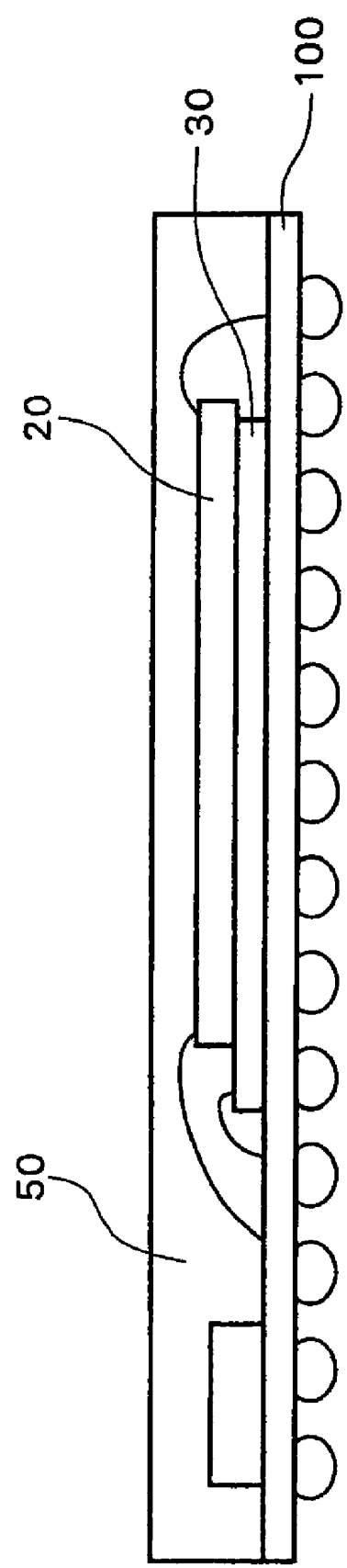
FIG. 2 is an explanatory schematic view of a semiconductor device 10 in a multi-chip package.

FIG. 2 shows the driver chip 20 and the logic chip 30 which are packaged on a common package substrate 100 within a single package using a mold material 50, such as resin. In the example shown FIG. 2, these two chips are stacked with the driver chip 20 on top of the logic chip 30 and packaged on the substrate 100 on which the mold material 50 is distributed so as to cover the entirety. The method of packaging the chips is not limited to the stacking method and the chips may be arranged in the horizontal direction. Furthermore, although a core substrate may be employed as the substrate 100, a packaging method in which the chips are fabricated directly on a wiring pattern film can be employed for a denser and thinner package. Moreover, the number of chips to be packaged is not limited to two, and additional chips may also be packaged together as necessary.

Figure 3:
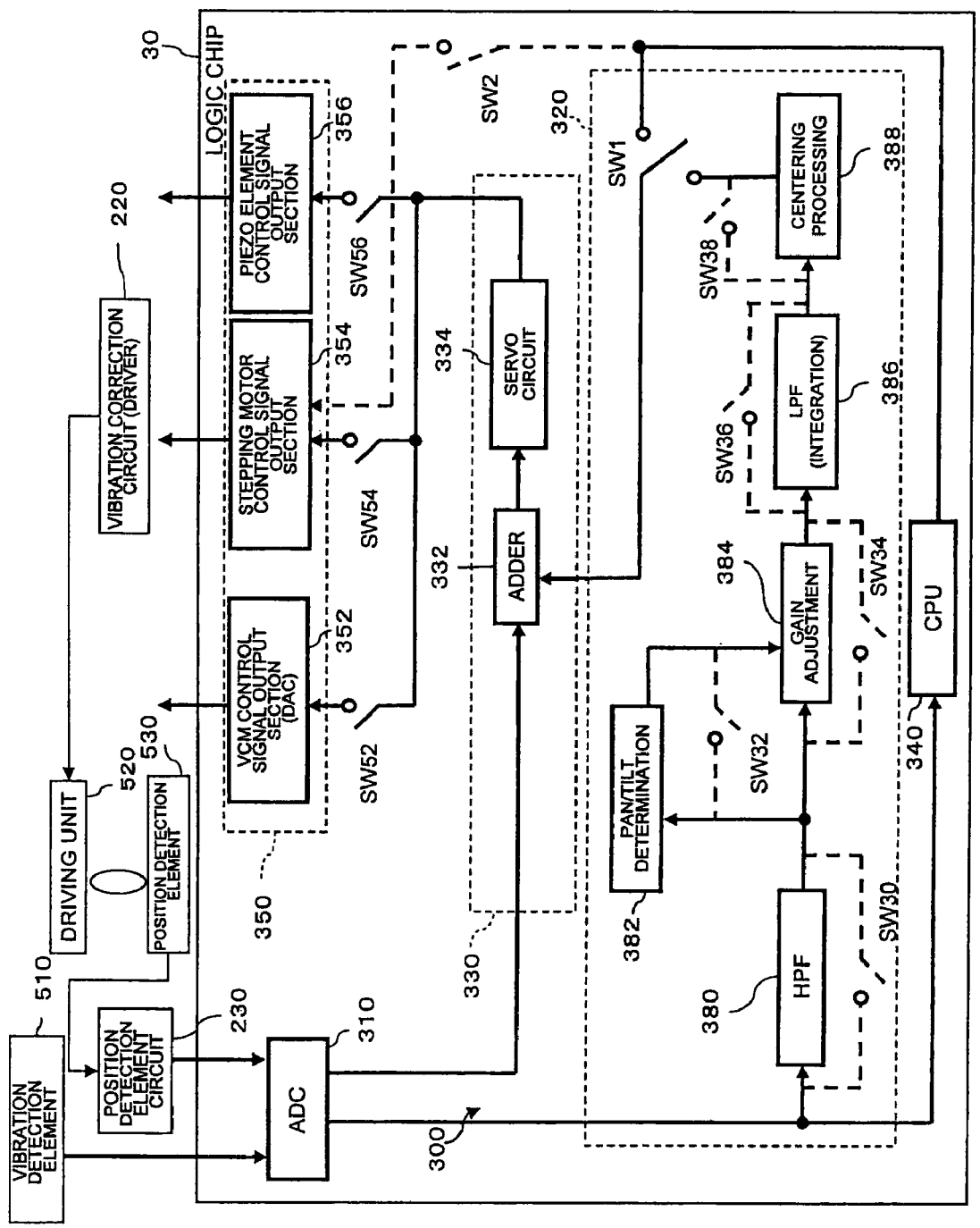
FIG. 3 is a diagram showing an example structure of a logic chip according to the embodiment of the present invention.

Referring now to FIG. 3, an example of a more specific structure of the logic chip 30 according to the present embodiment will be described.

The vibration detection signal which has been supplied from the vibration detection element (e.g. gyroscopic sensor) 510 to the ADC 310 for conversion to a digital signal is supplied to the vibration computing unit (e.g. gyroscopic equalizer) 320 including dedicated circuits which perform the respective processing operations for computation.

More specifically, the vibration detection signal output from the ADC 310 is supplied to an HPF (high pass filter) circuit 380, which removes frequency components lower than the frequency components of vibration due to hand vibration from the vibration detection signal.

A pan/tilt determination circuit 382 determines a panning motion and a tilting motion of an image capturing apparatus based on the vibration signal (the angular velocity signal) obtained by extraction of the hand vibration components, which is output from the HPF circuit 380. Here, a panning motion refers to motion of the image capturing apparatus in the horizontal direction in accordance with the movement of a subject and a tilting motion refers to motion of the image capturing apparatus in the vertical direction. When the image capturing apparatus is moved in accordance with the movement of the subject during image capturing, the vibration detection element 510 outputs a vibration detection signal corresponding to the movement. However, as variation of the angular velocity signals due to the panning motion and the tilting motion is not caused by hand vibration, it may not necessary, in this case, to correct the position of the optical component such as lens and so on. The pan/tilt determination circuit 382 can make a determination to not perform position correction control when such panning and tilting motions are determined.

A gain adjustment circuit 384 performs gain adjustment in accordance with the determination result from the pan/tilt determination circuit 382 so as to maintain the intensity of the vibration signal concerning the hand vibration components obtained from the HPF circuit 380.

An LPF (low pass filter) circuit 386 functions as an integration circuit. Specifically, the LPF 386 performs filtering processing by using a digital filter to thereby integrate the vibration signal whose gain has been adjusted and obtains the movement amount signal (the angular signal) representing an amount of movement (amount of vibration) of the image capturing apparatus.

A centering processing circuit 388 subtracts a predetermined value with respect to the movement amount signal output from the LPF circuit 386. When performing hand vibration correction processing in an image capturing apparatus, there are cases where, with the continuous execution of the correction processing, the lens position gradually shifts away from the reference position to reach a position near the limit in the movable range of the lens. In such a state, the further continuation of the hand vibration correction processing allows the lens to move only in one direction while preventing the lens from moving in the other direction. More specifically, while the lens is allowed to move toward the reference position of the lens, the lens is prevented from moving in the direction beyond the movable range. The centering processing circuit 388 is therefore provided such that such a correction limit cannot easily be reached. Specifically, the centering processing circuit 388 subtracts a predetermined value from the movement amount signal to perform control such that the limit of the movable range of the lens cannot easily be reached.

The movement amount signal which was subjected to the centering processing by the centering processing circuit 388 is supplied to the position computing unit (e.g. Hall equalizer) 330 via a switch SW1. The position computing unit 330 includes an adder circuit 332 and a servo circuit 334.

The position detection signal supplied to the logic chip 30 from the position detection element 530 which detects the lens position of the image capturing apparatus, through the position detection element circuit 230 and subject to digital conversion in the ADC 310, is supplied to the adder circuit 332. The adder circuit 332 adds the movement amount signal supplied from the centering processing circuit 388 to the position detection signal corresponding to the current lens position.

The servo circuit 334 generates a correction signal for controlling driving performed by the driving unit 520 based on the resultant signal supplied from the adder circuit 332. Here, the servo circuit 334 performs filtering processing by using a digital filter.

The correction signal output from the servo circuit 334 is supplied to the control signal output unit 350. The control signal output unit 350 outputs the correction signal supplied from the servo circuit 334 as a control signal corresponding to the vibration correction control unit 220 which can be adopted as hand vibration correction mechanism of the optical component.

In the example shown in FIG. 3, the control signal output unit 350 includes a VCM control signal output section 352, a stepping motor control signal output section 354, and a piezo element control signal output section 356, each connected to the servo circuit 334 via a corresponding one of switches SW52, SW54, and SW56. The correction signal is supplied to any of the signal output sections 352, 354, and 356 which is selected by the switch SW52, SW54, or SW56 and a vibration control signal is generated by the signal output section which is selected. When a VCM is adopted as the driving unit 520, for example, the VCM control signal output section 352 which is capable of outputting a vibration control signal corresponding to the vibration correction control circuit 220 for VCM is selected. Specifically, the VCM control signal output section 352 is selected by the switch SW52. Here, a digital-to-analog conversion (DAC) circuit can be adopted as the VCM control signal output section 352, and the vibration control signal which is converted into an analog signal in the VCM control signal output section 352 is output to the vibration correction control section 220 for use in driving the VCM.

When a stepping motor, not a VCM, is adopted as the driving unit 520, the stepping motor control signal output section 354 is selected by the switch SW54, whereas, when a piezo element is adopted, the piezo-element control signal output section 356 is selected by the switch SW56.

Here, control of the stepping motor by the servo circuit 334 is not necessary because driving performed by the stepping motor can be determined depending on the number of pulses of driving signals to be output with respect to the current motor position. Accordingly, when a stepping motor is adopted as a driving unit 520 and a correction signal is output to the stepping motor control signal output section 354 via the servo circuit 334, the signal output section 354 is controlled so as to substantially cancel the function of the servo motor 334. Further, with regard to the stepping motor control signal output section 354, computation of a correction signal can be performed by the CPU 340, rather than by the dedicated circuits. In this case, the correction signal is supplied from the CPU 340 to the stepping motor control signal output section 354 via the switch SW2 as shown by dotted line in FIG. 3. As such, a corresponding vibration control signal may be generated in the stepping motor control signal output section 354 based on the correction signal supplied from the CPU 340.

Further, not only the computation of a correction signal for driving the stepping motor as described above, but also the computation to be performed by the vibration computing unit 320 formed of dedicated circuits in FIG. 3 can be similarly executed by the CPU 340. When the computation result (a movement amount signal) obtained by the CPU 340 is used to perform vibration correction, the switch SW1 is switched such that the CPU 340 outputs the computation result to the adder circuit 332 of the position computing unit 330. Also, when, as described above, a servo function is not required, the computation result from the CPU 340 (correction signal) is supplied via the switch SW2 to the control signal output unit 350.

Further, the computation processing by each circuit block of the vibration computing unit 320 can be replaced by computation processing performed by the CPU 340. Specifically, instead of the output from a dedicated circuit of the vibration computing unit 320, the result of computation performed by the CPU 340 is supplied to the dedicated circuit in the following stage which performs the corresponding computation, by means of the switches SW30, SW32, SW34, SW36, and SW38. When the filtering processing in the HPF circuit 380 is performed by the CPU 340, for example, the switch SW30 is controlled such that the computation processing performed by the HPF circuit 380 will be skipped. Rather, the CPU 340 performs computation processing by extracting hand vibration components from the vibration detection signal supplied from the ADC circuit 310 to obtain a vibration signal, and outputs this computation processing result to the pan/tilt determination circuit 382 and the gain adjustment circuit 384. With regard to the pan/tilt determination, the gain adjustment, and LPF and centering processing, the corresponding switches, SW32, SW34, SW36, and SW38 can be similarly controlled to thereby individually adopt the result of computation performed by the CPU 340. As such, with regard to the computation functions in the operating units (320,330), especially the vibration computing unit 320 in this case, the computation processing performed by the CPU 340 can be used in place of all or any portion of the computation processing of the computing unit. Consequently, when it is difficult to address a change in the required precision in the driving unit (vibration correction element) 520 by the processing of the dedicated circuit block, the CPU 340 can still execute such processing. It is therefore possible to flexibly deal with the change in the apparatus in which the logic chip 30 is adopted.

Here, the signal output sections included in the control signal output unit 350 are not limited to the VCM control signal output section 352, the stepping motor control signal output section 354, and the piezo element control signal output section 356 described above, and only two of these signal output sections may be adopted or any signal output sections other than these signal output sections may be adopted. When an ultrasound motor is adopted as the vibration correction control unit 220, an ultrasound motor signal output section is provided in the control signal output unit 350.

Further, the driver chip 20 on which the vibration correction control unit 220 is integrated need not be necessarily fabricated in the same package in which the logic chip 30 is integrated as shown in FIGS. 1 and 2, and may be packaged separately from the logic chip 30. In the latter case, the vibration control signal is output from the logic chip 30 to the driver chip 20 through any one of the signal output sections 352, 354, and 356 in accordance with the type of the driving unit 520.

With the logic chip 30 and the driver chip 20 which are configured in an MCP structure or with a combination of the driver chip 20 and the logic chip 30 in separate packages, the function of correcting vibration can be achieved. The vibration correction function will be described below.

When there is no vibration such as hand vibration, the vibration computing unit 320 which processes a detection signal supplied from the vibration detection element 510 outputs a movement amount signal [0]. At this time, the optical axis of the lens of the image capturing apparatus to be driven by the driving unit 520 coincides with the center of the image sensor provided in the image capturing apparatus. Accordingly, the position detection signal output from the ADC 310 of the logic chip 30 to the position computing unit 330 indicates the position [0]. When the value of the position detection signal is [0], the servo circuit 334 outputs a correction signal which controls the driving unit 520 to maintain the current lens position.

When the optical axis of the lens and the center of the image sensor do not coincide with each other, a position detection signal supplied from the ADC 310 to the adder circuit 332 indicates a value other than [0]. Accordingly, with respect to the position detection signal which is not [0], the servo circuit 334 outputs a correction signal which drives the driving unit 520 such that this position detection signal indicates [0].

By repetition of such operation processing, the lens position is controlled such that the optical axis of the lens coincides with the center of the image sensor when no hand vibration is generated.

When, on the other hand, hand vibration does have an effect on the apparatus, the movement of the image capturing apparatus leads the vibration computing unit 320 to output a movement amount signal representing the movement amount (vibration amount) of the image capturing apparatus obtained based on the vibration detection signal detected by the vibration detection element 510. At this time, when a VCM is used as the driving unit 520, because the optical axis of the lens driven by the VCM coincides with the center of the image sensor, the position detection signal supplied from the ADC 310 indicates [0]. Consequently, an added signal obtained by adding this position detection signal indicating [0] and the movement amount signal, which is not [0], output from the vibration computing unit 320 is supplied to the servo circuit 334. The servo circuit 334 then outputs a correction signal for moving the lens such that the movement amount signal which is not [0] can be cancelled. This correction signal is further converted into an analog signal by the VCM control signal output section 352 and output to the vibration correction control unit 220, which drives the VCM for moving the lens position. As such, an image which is not blurred due to hand vibration is supplied from the lens to the image sensor of the image capturing apparatus. Through repetition of such control, correction control of the vibration due to hand vibration or the like is performed.

Figure 4:
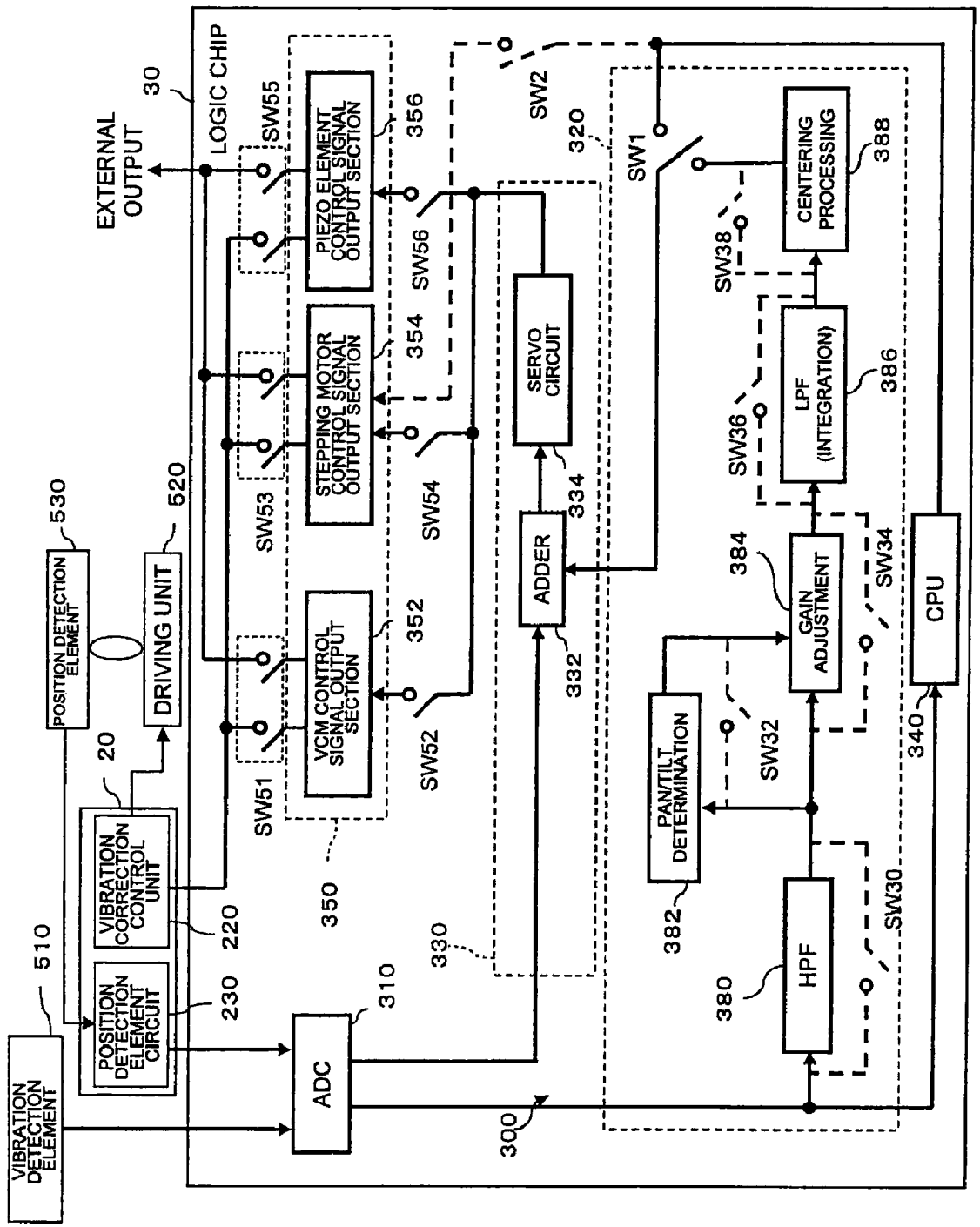
FIG. 4 is a diagram showing another example structure of a logic chip according to the embodiment of the present invention.
Figure 5:
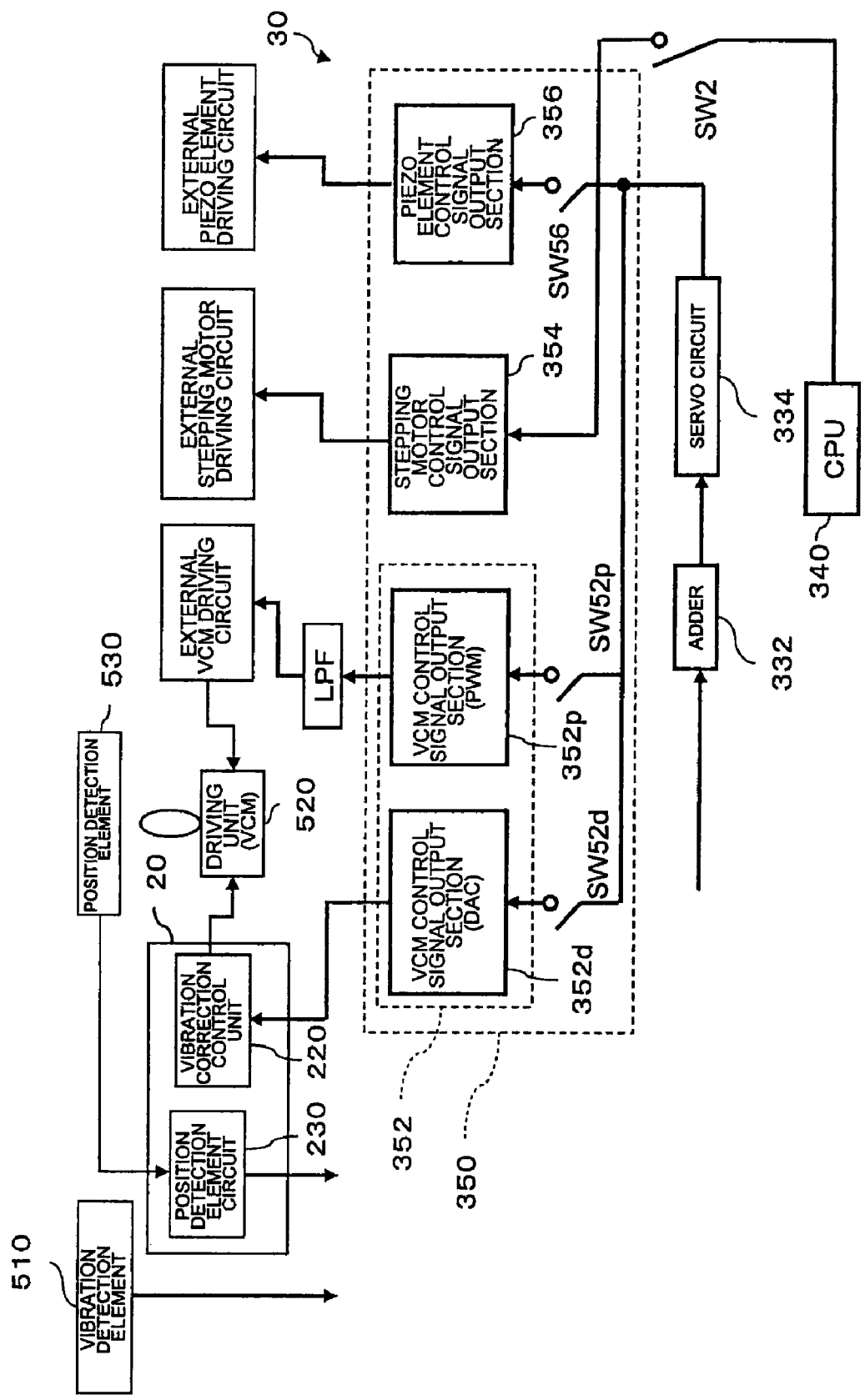
FIG. 5 is a diagram showing in more detail an example of a partial structure of the logic chip shown in FIG. 4.
Figure 6:
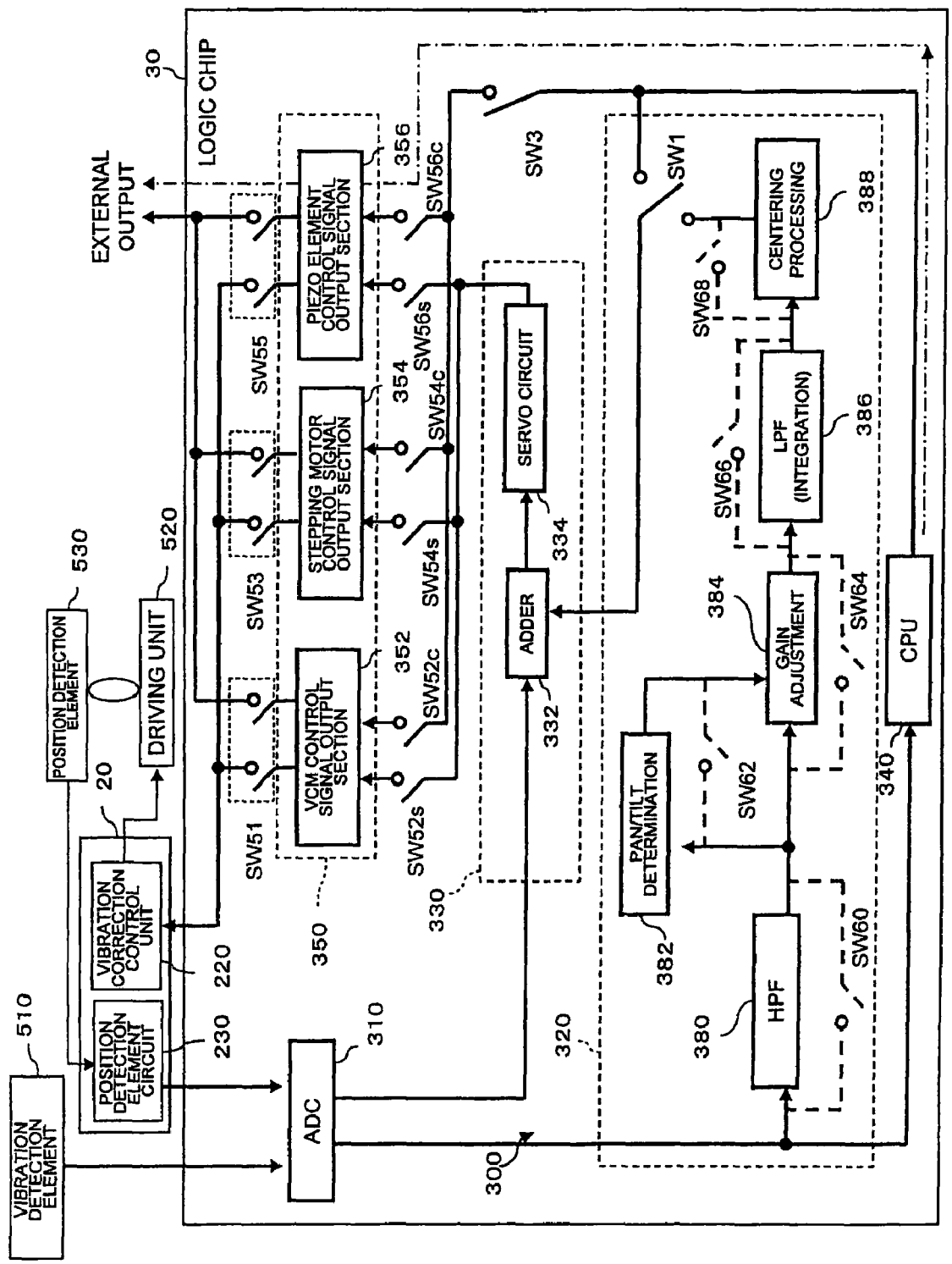
FIG. 6 is a diagram showing still another example structure of a logic chip according to the embodiment of the present invention.

Referring now to FIGS. 4 to 6, more specific example structures and modifications of the logic chip 30 will be described. In FIGS. 4 to 6, elements that are the same as those in FIG. 3 are designated by the same numerals and their description will not be repeated.

The logic chip 30 in the example shown in FIG. 4 includes an external output terminal independently from the driver output terminals which output a vibration control signal from the control signal output unit 350 to the driver chip 20 having an MCP structure as shown in FIGS. 1 and 2. Switching between the driver output terminals and the external output terminal can be controlled by switching units such as switches SW51, SW53, SW55, and so on, which are provided between the respective control signal output sections 352, 354, and 356 and the corresponding driver output terminals and the external output terminal, respectively.

With this structure, even when the driver chip 20 including a circuit for driving the driving unit 520 and the logic chip 30 as shown in FIG. 4 are integrated in the same package, a control signal from a desired control signal output section can be output from the external output terminal.

For example, even when an image capturing apparatus employs, as the driving unit 520, a stepping motor or a piezo element, rather than a VCM, a vibration control signal for the corresponding stepping motor or piezo element can be supplied from the external output terminal of the logic chip 30 which is integrated in the same package as that of VCM driver chip 20.

As such, even with regard to an image capturing apparatus including a driving mechanism for the driving unit 520, which does not correspond to the mechanism of the vibration correction circuit 220, a common MCP can be used without changing the packaging in each case.

Alternatively, in addition to the structure in which an image capturing apparatus includes a driving mechanism for the driving unit 520 which does not correspond to the a mechanism of the vibration correction circuit 220 as described above, it is also possible to adopt the structure as shown in FIG. 5 in which an output from the VCM control signal output section 352 is supplied to both the driver chip 20 configured in a MCP structure and the external output terminal, for example. In this example, for example, an output from the DAC circuit 352d is used as a VCM vibration control signal to be supplied to the driver chip 20, whereas a PWM signal from the PWM circuit 352p which subjects pulse width modulation to a VCM vibration control signal and outputs the resultant signal can be selected and output as a vibration control signal from the external output terminal, and vice versa. Here, when a vibration control signal with a higher precision with respect to the number of bits corresponding to the DAC circuit 352d is required, it is possible to supply the output from the PWM conversion circuit 352p through an external LPF to an external VCM driving circuit, rather than performing digital-to-analog conversion in the DAC circuit 352d. The PWM conversion circuit, which can be configured in the form of a digital circuit, can deal with the increase in the number of bits more easily than the DAC circuit 352d. As such, with the use of the PWM conversion circuit 352p, the bit precision can easily be increased.

Further, the present invention is not limited to a structure in which a single external output terminal is provided, and a structure in which a vibration control signal can be output from each of the signal output sections to the external output terminal or to the driver chip 20 having a multi-chip package structure as shown in FIG. 5 may be employed. In an application in which a control signal is output to both the external stepping motor for which control by the servo circuit 334 is not required and to the external VCM, for example, a vibration control signal based on the correction signal supplied from the vibration computing unit 320 and the position computing unit 330 in which dedicated circuits are used can be output from the PWM circuit 352p to the external VCM. On the other hand, a control signal for the external stepping motor can be output from the stepping motor control signal output section 354 by using a signal which is obtained by computation performed by the CPU 340 in parallel to computation of the control signal for the VCM and which is input to the stepping motor control signal output section 354 via the switch SW2.

In the structure example shown in FIG. 6, an output from the position computing unit 330 and an output from the CPU 340 can be selectively supplied to any of the signal output sections 352, 354, or 356 by means of switches SW52s, SW52c, SW54s, SW54c, SW56s, and SW56c. Further, as in the example shown in FIG. 4, the structure shown in FIG. 6 is configured such that the control signals from the signal output sections 352, 354, and 356 can be switchably output to the MCP driver chip or to the external output terminal by means of the switches SW51, SW53, and SW55.

With the switch structure as described above, it is possible to select a correction signal which is wholly or partially generated by the dedicated circuits or the correction signal generated by the CPU 340, in accordance with the type, required precision, and so on, of the vibration correction mechanism which is used in an image capturing apparatus in which the logic chip 30 according to the present embodiment is eventually adopted. Further, it is also possible to select the vibration control signal from any of the signal output sections 352, 354, and 356. Such a switchable structure allows the logic chip 30 according to the present embodiment to be adopted in a very wide range of applications. Also, in this structure, both a supply path from the position computing unit 330 and a supply path from the CPU 340 are provided as supply paths for supplying a signal to the signal output unit 350. Accordingly, it is possible, for example, to generate a control signal from the signal obtained by computing units 320 and 330 and supply the control signal to the driver chip 20 for the purpose of correction of hand vibration, whereas it is possible to output a control signal obtained by computation by the CPU 340 from the corresponding signal output section 356 through the external output terminal, for the purpose of driving other than driving for the hand vibration correction, such as lens driving for auto focusing and zooming, for example. In the example indicated by a dot-dash line in FIG. 6, it is possible to output the control signal supplied from the piezo element control signal output section 356 from the external output terminal. In this case, a correction signal obtained by computation performed by the CPU 340 is supplied to the piezo element control signal output section 356.

While the preferred embodiment of the present invention has been described using specific terms, such description is for illustrative purposes only, and it is to be understood that changes and variations may be made without departing from the spirit or scope of the appended claims.

What is claimed is:

1. A semiconductor device in which a driver chip having an analog circuit and a logic chip having a digital circuit are sealed in a single package,
    the driver chip including a vibration correction control unit for achieving an anti-shake function in an apparatus in which the semiconductor device is provided, and
    the logic chip including:
    a correction signal processing unit which obtains a value for vibration of the apparatus based on a vibration detection signal supplied from a vibration detection element to generate a correction signal;
    a control signal output unit which includes a plurality of types of signal output sections and outputs a vibration control signal in accordance with the correction signal to the vibration correction control unit, which executes vibration correction control for an optical component in accordance with vibration;
    a driver output terminal which outputs the vibration control signal to the driver chip;
    an external output terminal which outputs a control signal to an external circuit other than the driver chip; and
    an output switch unit which connects one signal output section among the plurality of types of signal output sections with the driver output terminal for outputting the vibration control signal corresponding to a driving unit which drives the optical component and connects another signal output section of the plurality of types of signal output sections with the external output terminal for outputting the control signal corresponding to the external circuit.

2. The semiconductor device according to claim 1, wherein the plurality of types of signal output sections include at least two types of signal output sections among a voice coil motor control signal output section, a stepping motor control signal output section, and a piezo element control signal output section.

3. The semiconductor device according to claim 1, wherein the plurality of types of signal output sections include a voice coil motor control signal output section having a digital to analog conversion circuit which converts a digital signal supplied from the correction signal processing unit to an analog signal and a pulse width modulation unit which generates a pulse width modulation signal from a digital signal supplied from the correction signal processing unit, and
    the output switch unit connects one of the digital to analog conversion circuit and the pulse width modulation unit with the driver output terminal and connects either one of the other one of the digital to analog conversion circuit and the pulse width modulation unit or another signal output section among the plurality of types of signal output sections other than the voice coil motor control signal output section with the external output terminal.

4. The semiconductor device according to claim 1, wherein the plurality of types of signal output sections are provided corresponding to a plurality of types of vibration correction control sections which can be adopted as the vibration correction control unit which executes vibration correction control for the optical component.

5. An image capturing apparatus comprising:
    a lens;
    an image sensor;
    a driving unit which drives the lens or the image sensor;
    a vibration detection element which detects vibration of the image capturing apparatus; and
    a semiconductor device in which a driver chip having an analog circuit and a logic chip having a digital circuit are sealed in a single package,
    wherein
    the driver chip of the semiconductor device includes a vibration correction control unit for achieving an anti-shake function in the image capturing apparatus, and
    the logic chip of the semiconductor device includes:
    a correction signal processing unit which obtains a value for vibration of the image capturing apparatus based on a vibration detection signal supplied from the vibration detection element to generate a correction signal;
    a control signal output unit which includes a plurality of types of signal output sections and outputs a vibration control signal in accordance with the correction signal to the vibration correction control unit which executes vibration correction control for the lens or the image sensor in accordance with vibration;
    a driver output terminal which outputs the vibration control signal to the driver chip;
    an external output terminal which outputs a control signal to an external circuit other than the driver chip; and
    an output switch unit which connects one signal output section among the plurality of types of signal output sections with the driver output terminal for outputting the vibration control signal corresponding to the driving unit and connects another signal output section of the plurality of types of signal output sections with the external output terminal for outputting the control signal corresponding to the external circuit.

6. The image capturing apparatus according to claim 5, wherein
    the plurality of types of signal output sections include at least two types of signal output sections among a voice coil motor control signal output section, a stepping motor control signal output section, and a piezo element control signal output section.

7. The image capturing device according to claim 5, wherein
    the plurality of types of signal output sections include a voice coil motor control signal output section having a digital to analog conversion circuit which converts a digital signal supplied from the correction signal processing unit to an analog signal and a pulse width modulation unit which generates a pulse width modulation signal from a digital signal supplied from the correction signal processing unit, and
    the output switch unit connects one of the digital to analog conversion circuit and the pulse width modulation unit with the driver output terminal and connects either one of the other one of the digital to analog conversion circuit and the pulse width modulation unit or another signal output section among the plurality of types of signal output sections other than the voice coil motor control signal output section with the external output terminal.

8. A semiconductor device in which a driver chip having an analog circuit and a logic chip having a digital circuit are fabricated on a common substrate and sealed in a single package,
the driver chip including a vibration correction control unit for achieving an anti-shake function in an apparatus in which the semiconductor device is provided,
the logic chip including:
a correction signal processing unit which obtains a value for vibration of the apparatus based on a vibration detection signal supplied from a vibration detection element to generate a correction signal;
a control signal output unit which includes a plurality of types of signal output sections and outputs a vibration control signal in accordance with the correction signal to the vibration correction control unit;
a driver output terminal which outputs the vibration control signal to the driver chip;
an external output terminal which outputs a control signal to an external circuit other than the driver chip;
an output switch unit which connects one signal output section among the plurality of types of signal output sections with the driver output terminal for outputting the vibration control signal corresponding to a driving unit which drives the optical component and connects another signal output section of the plurality of types of signal output sections with the external output terminal for outputting the control signal corresponding to the external circuit; and
a central processing unit which performs processing of a signal to be used in the apparatus,
wherein
the correction signal processing unit is formed of either one or both of the central processing unit and a dedicated circuit which executes signal processing for generating the correction signal from the vibration detection signal, and
a signal from the central processing unit is supplied to a signal output section connected with the external output terminal among the plurality of signal output sections, and the control signal which is generated based on the signal which is supplied is output through the external output terminal.

9. The semiconductor device according to claim 8, wherein
the plurality of types of signal output sections include at least two types of signal output sections among a voice coil motor control signal output section, a stepping motor control signal output section, and a piezo element control signal output section.

10. The semiconductor device according to claim 8, wherein
the central processing unit is capable of executing at least a part of the signal processing to be performed by the dedicated circuit of the correction signal processing unit.

11. The semiconductor device according to claim 8, wherein
the plurality of types of signal output sections are provided corresponding to a plurality of types of vibration correction control sections which can be adopted as the vibration correction control unit which executes vibration correction control for the optical component.

12. An image capturing apparatus comprising:
a lens;
an image sensor;
a driving unit which drives the lens or the image sensor;
a vibration detection element which detects vibration of the image capturing apparatus; and
a semiconductor device in which a driver chip having an analog circuit and a logic chip having a digital circuit are fabricated on a common substrate and sealed in a single package,
wherein
the driver chip of the semiconductor device includes a vibration correction control unit for achieving an anti-shake function in the image capturing apparatus, and
the logic chip of the semiconductor device includes:
a correction signal processing unit which obtains a value for vibration of the apparatus based on a vibration detection signal supplied from the vibration detection element to generate a correction signal;
a control signal output unit which includes a plurality of types of signal output sections and outputs a vibration control signal in accordance with the correction signal to the vibration correction control unit;
a driver output terminal which outputs the vibration control signal to the driver chip;
an external output terminal which outputs a control signal to an external circuit other than the driver chip;
an output switch unit which connects one signal output section among the plurality of types of signal output sections with the driver output terminal for outputting the vibration control signal corresponding to the driving unit and connects another signal output section of the plurality of types of signal output sections with the external output terminal for outputting the control signal corresponding to the external circuit; and
a central processing unit which performs processing of a signal to be used in the image capturing apparatus,
and wherein
the correction signal processing unit is formed of either one or both of the central processing unit and a dedicated circuit which executes signal processing for generating the correction signal from the vibration detection signal, and
a signal from the central processing unit is supplied to a signal output section connected with the external output terminal among the plurality of signal output sections, and the control signal which is generated based on the signal which is supplied is output through the external output terminal.

13. The image capturing apparatus according to claim 12, wherein
the plurality of types of signal output sections include at least two types of signal output sections among a voice coil motor control signal output section, a stepping motor control signal output section, and a piezo element control signal output section.

14. The image capturing apparatus according to claim 12, wherein
the central processing unit is capable of executing at least a part of the signal processing to be performed by the dedicated circuit of the correction signal processing unit.

15. The image capturing apparatus according to claim 12, wherein
the plurality of types of signal output sections are provided corresponding to a plurality of types of vibration correction control sections which can be adopted as the vibration correction control unit.

* * * * *